US012461543B2

(12) United States Patent
Abeywardena et al.

(10) Patent No.: US 12,461,543 B2
(45) Date of Patent: Nov. 4, 2025

(54) USING NeRF MODELS TO FACILITATE OPERATIONS OF A UAV DELIVERY SERVICE (71) Applicant: WING Aviation LLC, Mountain View, CA (US)

(72) Inventors: Dinuka Abeywardena, Mountain View, CA (US); Konstantin Bozhkov, Santa Clara, CA (US); Linhao Jin, Santa Clara, CA (US); Domitille Commun, Los Altos, CA (US); Xinzhi Fan, San Mateo, CA (US); Kyle Krafka, Los Altos, CA (US)

(73) Assignee: Wing Aviation LLC, Palo Alto, CA (US)

( * ) Notice: Subject to any disclaimer, the term of this patent is extended or adjusted under 35 U.S.C. 154(b) by 148 days.

(21) Appl. No.: 18/382,806

(22) Filed: Oct. 23, 2023

(65) Prior Publication Data

US 2025/0130581 A1  Apr. 24, 2025

(51) Int. Cl.
G05D 1/46 (2024.01)
G06N 3/02 (2006.01)

(52) U.S. Cl.
CPC ............ G05D 1/46 (2024.01); G06N 3/02 (2013.01)

(58) Field of Classification Search
CPC .................. G05D 1/46; G06N 3/02
USPC .......................................... 701/8
See application file for complete search history.

(56) References Cited

U.S. PATENT DOCUMENTS

2020/0103552 A1   4/2020 Phelan et al.
2022/0398806 A1*  12/2022 Arksey ............... H04B 17/318
2023/0177822 A1   6/2023 Casser et al.

OTHER PUBLICATIONS

Tancik, M. et al., "Block-NeRF: Scalable Large Scene Neural View Synthesis", arXiv:2202.05263v1 [cs.CV] Feb. 10, 2022, 15 pages.
PCT International Search Report and Written Opinion mailed Nov. 18, 2024, in corresponding PCT Application No. PCT/US2024/042536, 11 pages.
Tancik et al., "Fourier Features Let Networks Learn High Frequency Functions in Low Dimensional Domains," arXiv:2006.10739v1 [cs.CV] Jun. 18, 2020, 24 pages.
Chenxi Lola Deng et al. "Compressing Explicit Voxel Grid Representations: fast NeRFs become also small," LTCI, T'el 'ecom Paris, Institut Polytechnique de Paris, arXiv:2210.12782v1 [cs.CV] Oct. 23, 2022, 18 pages.

(Continued)

Primary Examiner — Mahmoud S Ismail
(74) Attorney, Agent, or Firm — Christensen O'Connor Johnson Kindness PLLC (57) ABSTRACT A method of operation of an unmanned aerial vehicle (UAV) service includes acquiring aerial images of a scene at an area of interest (AOI), wherein the aerial images are acquired with a UAV of the UAV service during a flight mission of the UAV that passes over the AOI; uploading a mission log of the flight mission to a backend data system of the UAV service, the mission log including image data that includes, or is derived from, at least a portion of the aerial images; and training a neural radiance field (NeRF) model with one or more of the aerial images, wherein the NeRF model comprises a neural network, which after the training, encodes a volumetric representation of the scene capable of generating novel views of the scene different than any of the aerial images used to train the NeRF model.

22 Claims, 8 Drawing Sheets (56) References Cited

OTHER PUBLICATIONS

Dipam Patel et al., "DroNeRF: Real-time Multi-agent Drone Pose Optimization for Computing Neural Radiance Fields," Department of Computer Science, Purdue University, USA, arXiv 2303.04322v1 [cs.RO] Mar. 8, 2023, 8 pages.

Kangle Deng et al. "Depth-supervised NeRF: Fewer Views and Faster Training for Free," arXiv:2107.02791v2 [cs.CV] Apr. 29, 2022, 13 pages.

Wikipedia, The Free Encyclopedia, "Multilayer perceptron", Retrieved from https://en.wikipedia.org/w/index.php?title=Multilayer_perceptron&oldid=1159593212 Jun. 18, 2023, 6 pages.

Ben Mildenhall et al., "NeRF: Representing Scenes as Neural Radiance Fields for View Synthesis," arXiv:2003.08934v2 [cs.CV] Aug. 3, 2020, 25 pages.

Martin Anderson, "NeRF: Training Drones in Neural Radiance Environments", Artificial Intelligence, Unite AI, updated on Dec. 9, 2022, 6 pages.

Haithem Turki et al. "Mega-NeRF: Scalable Construction of Large-Scale NeRFs for Virtual Fly-Throughs,", Carnegie Mellon University, prior to Jun. 18, 2023, 14 pages.

Vincent Sitzmann et al., "Implicit Neural Representations with Periodic Activation Functions," Stanford University, arXiv:2006.09661v1 [cs.CV] Jun. 17, 2020, 35 pages.

Wikipedia, The Free Encyclopedia, "Structure from motion," Retrieved from "https://en.wikipedia.org/w/index.php?title=Structure_from_motion&oldid=1138747075" Jun. 18, 2023, 7 pages.

Datagen: 'Neural Radiance Field (NeRF): Gentle Introduction', Retrieved from https://datagen.tech/guides/synthetic-data/neural-radiance-field-nerf/ Sep. 20, 2023, 9 pages.

Fu Li et al., 'NeRF-Pose: A First-Reconstruct-Then-Regress Approach for Weakly-supervised 6D Object Pose Estimation,' arXiv:2203.04802v2 [cs.CV] Sep. 9, 2023, 12 pages.

\* cited by examiner

USING NeRF MODELS TO FACILITATE OPERATIONS OF A UAV DELIVERY SERVICE

TECHNICAL FIELD

This disclosure relates generally to unmanned aerial vehicles (UAVs), and in particular but not exclusively, relates to operations of a UAV delivery service using neural radiance fields (NeRFs).

BACKGROUND INFORMATION

An unmanned vehicle, which may also be referred to as an autonomous vehicle, is a vehicle capable of traveling without a physically present human operator. Various types of unmanned vehicles exist for various different environments. For instance, unmanned vehicles exist for operation in the air, on the ground, underwater, and in space. Unmanned vehicles also exist for hybrid operations in which multi-environment operation is possible. Unmanned vehicles may be provisioned to perform various different missions, including payload delivery, exploration/reconnaissance, imaging, public safety, surveillance, or otherwise. The mission definition will often dictate a type of specialized equipment and/or configuration of the unmanned vehicle.

Unmanned aerial vehicles (also referred to as drones) can be adapted for package delivery missions to provide an aerial delivery service. One type of unmanned aerial vehicle (UAV) is a vertical takeoff and landing (VTOL) UAV. VTOL UAVs are particularly well-suited for package delivery missions. The VTOL capability enables a UAV to takeoff and land within a small footprint thereby providing package pick-ups and deliveries almost anywhere. To safely deliver packages in a variety of environments (particularly environments of first impression or populated urban/suburban environments), the UAV should be capable of effectively identifying and avoiding ground-based obstacles. The ability to acquire and maintain accurate, detailed, and up-to-date terrain models of the delivery destinations and surrounding environments can help facilitate safe and intelligent navigation at these drop zones. Accurate terrain models not only facilitate safe operation and obstacle avoidance during day-to-day operations of a UAV delivery service, but can also facilitate high fidelity, robust simulations to vet UAV designs and software systems.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method of operation for using neural radiance field (NeRF) models to improve the operations of an unmanned aerial vehicle (UAV) service, such as a UAV delivery service, are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Described herein are techniques for generating, updating, and using neural radiance field (NeRF) models to streamline the operations and simulations of a UAV service, such as a UAV delivery service. The techniques include the use of NeRF models to trigger acquisition of aerial images of geographic areas of interest flown over by UAVs of the UAV service. The NeRF models may be used to compress the aerial images for efficient conveyance of mission logs, including the aerial images, to a backend data system (e.g., cloud-based command and control) of the UAV service. The geographic areas of interest (AOI) may include nests (aka terminal areas) for local staging of a fleet of UAVs servicing a community, vendor pickup locations, customer delivery locations (drop zones), locations of ground-based obstacles (e.g., telephone poles, streetlights, radio towers, tall trees, etc.), or otherwise. Once acquired/updated, the NeRF models are particularly effective for generating/synthesizing realistic images (i.e., novel views) for use with offline simulations of UAV operations. These UAV flight simulations can be used to test or vet UAV hardware and/or software revisions under consideration before pushing the revisions out to the fleet. Relevant NeRF models may be uploaded to a given UAV with its mission data or uploaded to an entire deployed fleet of UAVs servicing a common neighborhood. The UAVs may then reference their onboard NeRF models to inform visual navigation decisions (e.g., obstacle avoidance, real-time route planning & navigation, etc.), trigger aerial image acquisitions to refresh an out-of-date terrain model, and even generate pose estimates of new aerial images that are acquired. Of course, other use cases are anticipated as well.

The ability to acquire and maintain accurate, detailed, and up-to-date terrain models of the delivery destinations, and other AOIs, not only facilitates safe and intelligent navigation at these AOIs, but also facilitates the training of machine learning (ML) models used throughout the UAV service and UAV flight simulations vetting new designs and revisions of software/hardware components. It may be cost prohibitive to acquire and convey the aerial imagery needed to generate detailed models for these simulations and ML training. In many instances, the quality and robustness of ML models and UAV flight simulations is directly correlated with the volume, quality, and variety of the dataset (e.g., aerial images) used to train the ML model and test software/hardware revisions.

Embodiments disclosed herein describe a technique for efficiently compressing aerial images acquired by a UAV into a neural network, such as a NeRF model, which can then be communicated to a backend data system of the UAV delivery service. In other words, the NeRF model can be trained to encode a volumetric representation of the scene captured by a sparse set of two-dimensional (2D) aerial images. Once communicated to the backend data system, the NeRF model may then be used to not only regenerate the originally captured aerial images, but also generate novel views of the scene from vantage points different from the vantage points of the originally captured aerial images. In this manner, the NeRF model may be referred to as a generative neural network due to its ability to generate photorealistic novel views of the scene. The NeRF model may be implemented as a deep fully-connected neural network without any convolutional layers (often referred to as a multilayer perceptron or MLP). The NeRF model represents a highly efficient mechanism to capture and convey image data from the UAV to the backend data system. As mentioned above, the NeRF models may be used to inform future delivery missions to the same destination, generate diverse, high quality (e.g., photorealistic) training data to train other ML models throughout the UAV delivery system, facilitate UAV flight simulations, or even incorporate the NeRF model (or images output therefrom) into the mission data itself of a future delivery mission. The NeRF models (or images output therefrom) may effectuate improved localization, obstacle avoidance, and decision making at a given AOI.

Compression of the aerial images into the NeRF model may be accomplished via an optimization of the neural network weights (and biases), also referred to as training of the neural network. Once trained, the NeRF model encodes a volumetric representation of the scene captured by the aerial images used to train the NeRF model. These aerial images may be referred to as training data or ground truth data, which may also include additional metadata such as image depth information, position/motion/orientation information from the UAV, etc. In order to effectively train the neural network, the training data should include aerial images capturing the scene from a variety of different vantage points (e.g., two or more) offset from each other. These aerial images may be referred to as a sparse dataset since the aerial images include vantage point gaps and only capture the scene with a limited set of discontinuous (potentially nonoverlapping) images. The optimization of the weights themselves may be implemented with a variety of known techniques including NeRF optimization, Depth-Supervised (DS) NeRF optimization, Regularizing NeRF (RegNeRF), Pixel NeRF, Mega-NeRF, Learn from One Look NeRF (LOLNeRF), Multiscale Representation for Anti-Aliasing NeRF (Mip-NeRF), Plenoptic voxels (Plenoxels) NeRF, or otherwise. These and other features are described below.

Figure 1:
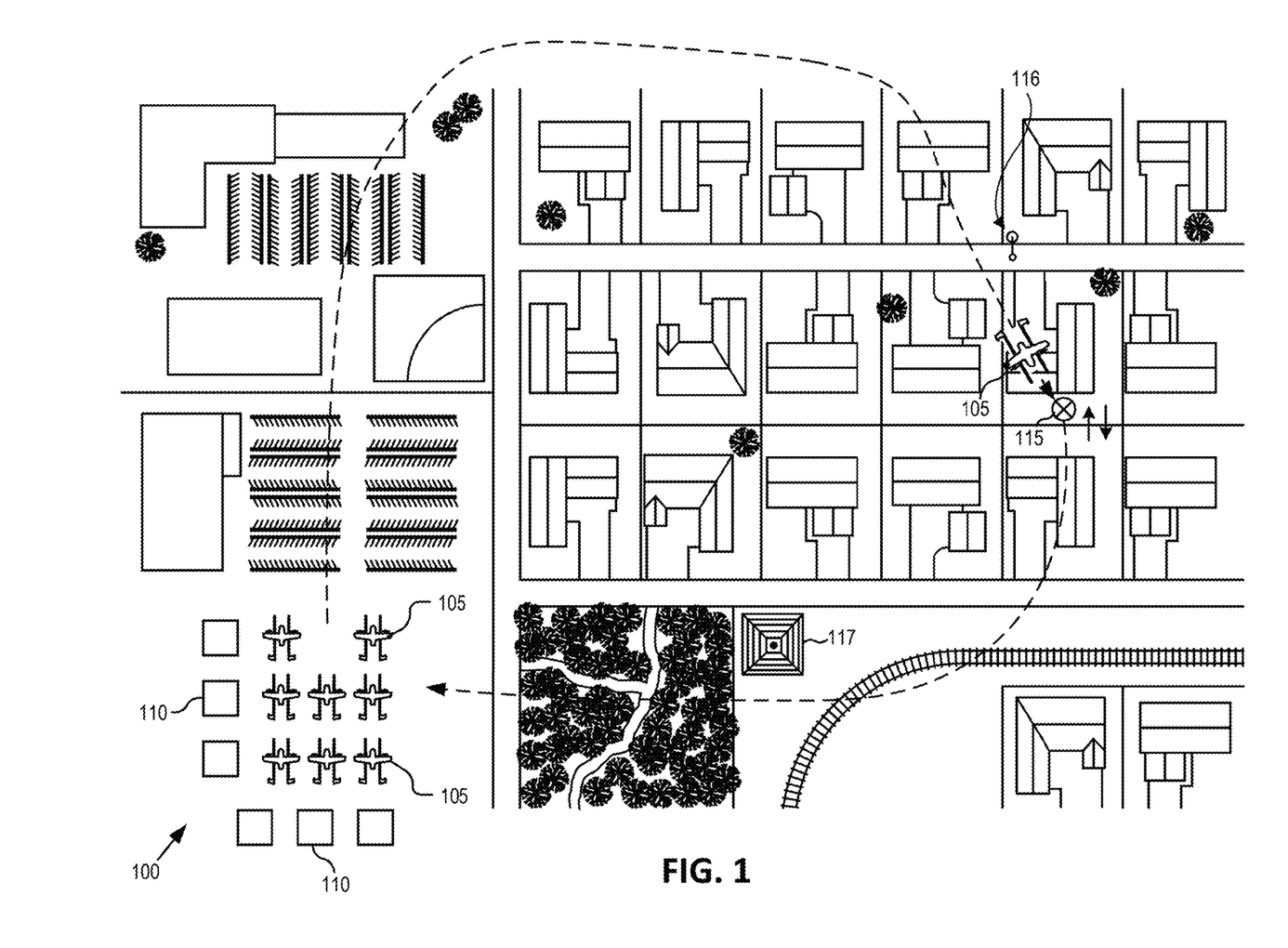
FIG. 1 illustrates operation of an unmanned aerial vehicle (UAV) delivery service that delivers packages into a neighborhood, in accordance with an embodiment of the disclosure.

FIG. 1 is a plan view illustration including a terminal area 100 for staging UAVs 105 that deliver packages into a neighborhood, in accordance with an embodiment of the disclosure. UAVs may one day routinely deliver items into urban or suburban neighborhoods from small regional or neighborhood hubs such as terminal area 100 (also referred to as a local nest or staging area). Vendor facilities that wish to take advantage of the aerial delivery service may set up adjacent to terminal area 100 (such as vendor facilities 110) or be dispersed throughout the neighborhood for waypoint package pickups (not illustrated). An example aerial delivery mission may include multiple flight phases or flight segments such as: (1) UAV 105 taking off from terminal area 100 with a package for delivery to a destination area 115 (e.g., the delivery zone) and rising to a cruise altitude, (2) cruising to destination area 115, (3) at destination area 115 descending for package drop-off before once again, (4) ascending to a cruise altitude for the return journey back to terminal area 100, and (5) descending to land on a staging pad at terminal area 100. Accordingly, the flight phases include a series of takeoffs, hovering, pickups/drop-offs, and landings.

Figure 5:
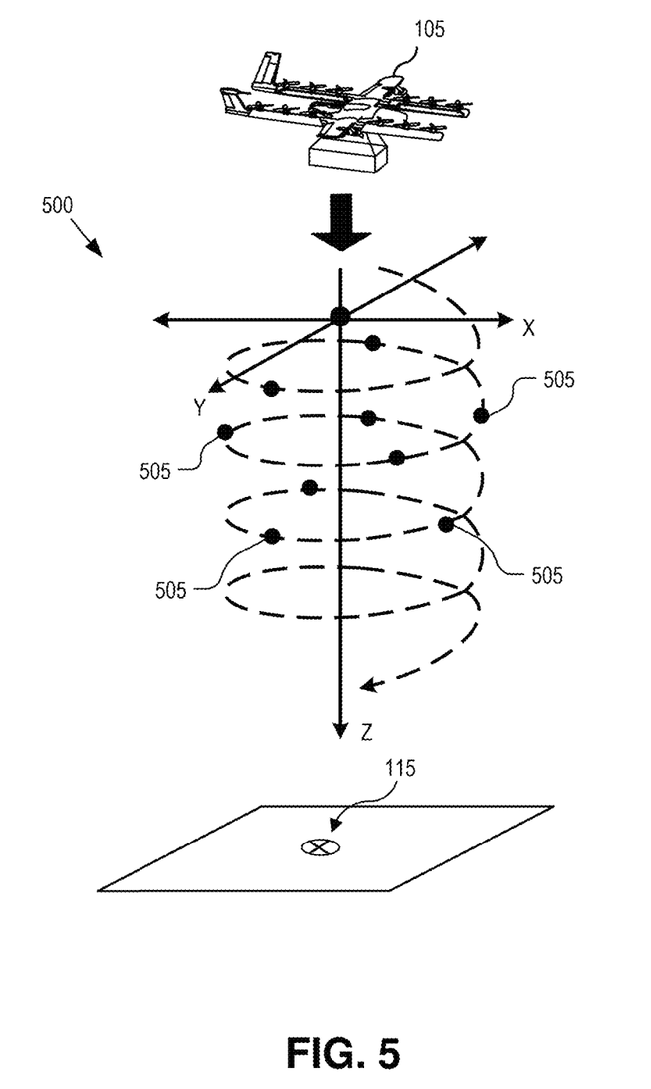
FIG. 5 illustrates a spiral descent pattern for acquiring a larger more complete set of aerial images of a scene at an area of interest to train a NeRF model and update an out-of-date terrain model, in accordance with an embodiment of the disclosure.

While hovering over destination area 115 or encountering a ground based obstacle such as streetlight 116 or radio tower 117, UAV 105 may capture a number of aerial images of the scene present at the AOI with its onboard camera system. These aerial images may be captured from a variety of different UAV vantage points offset from each other. For example, these aerial images may be captured while UAV 105 descends towards the ground to drop off a package as part of the delivery mission. UAV 105 may execute a spiral descent pattern 500 (see FIG. 5) over destination area 115 to acquire a distributed spatial sampling of the scene from many vantage points 505. Contemporaneously with capturing the sparse set of aerial images, onboard sensors of UAV 105 may measure a motion, a position, and/or an orientation of UAV 105 while capturing each aerial image. Sensor metadata indicative of the motion, position, and/or orientation of UAV 105 is associated with the aerial images and saved to collectively form a training dataset. The training dataset may then be cached onboard UAV 105 for the return trip back to terminal area 100. While waiting at terminal area 100 and charging for the next delivery mission, the otherwise idle processing resources of UAV 105 may be applied to compress the aerial images into a NeRF model by training the NeRF model to optimize its weights in a manner that efficiently encodes a volumetric representation of the scene at destination area 115. Of course, the onboard compute resources of UAV 105 may immediately commence the NeRF optimization if spare resources and battery charge are available prior to returning to terminal area 100. After the NeRF model has been trained, the training data including the aerial images, may be deleted while the NeRF model with its optimized weights is communicated to a backend data system. This enables efficient transport of the volumetric representation of the scene to the backend data system without communicating the aerial images themselves, which occupy a much larger data space.

Figure 2:
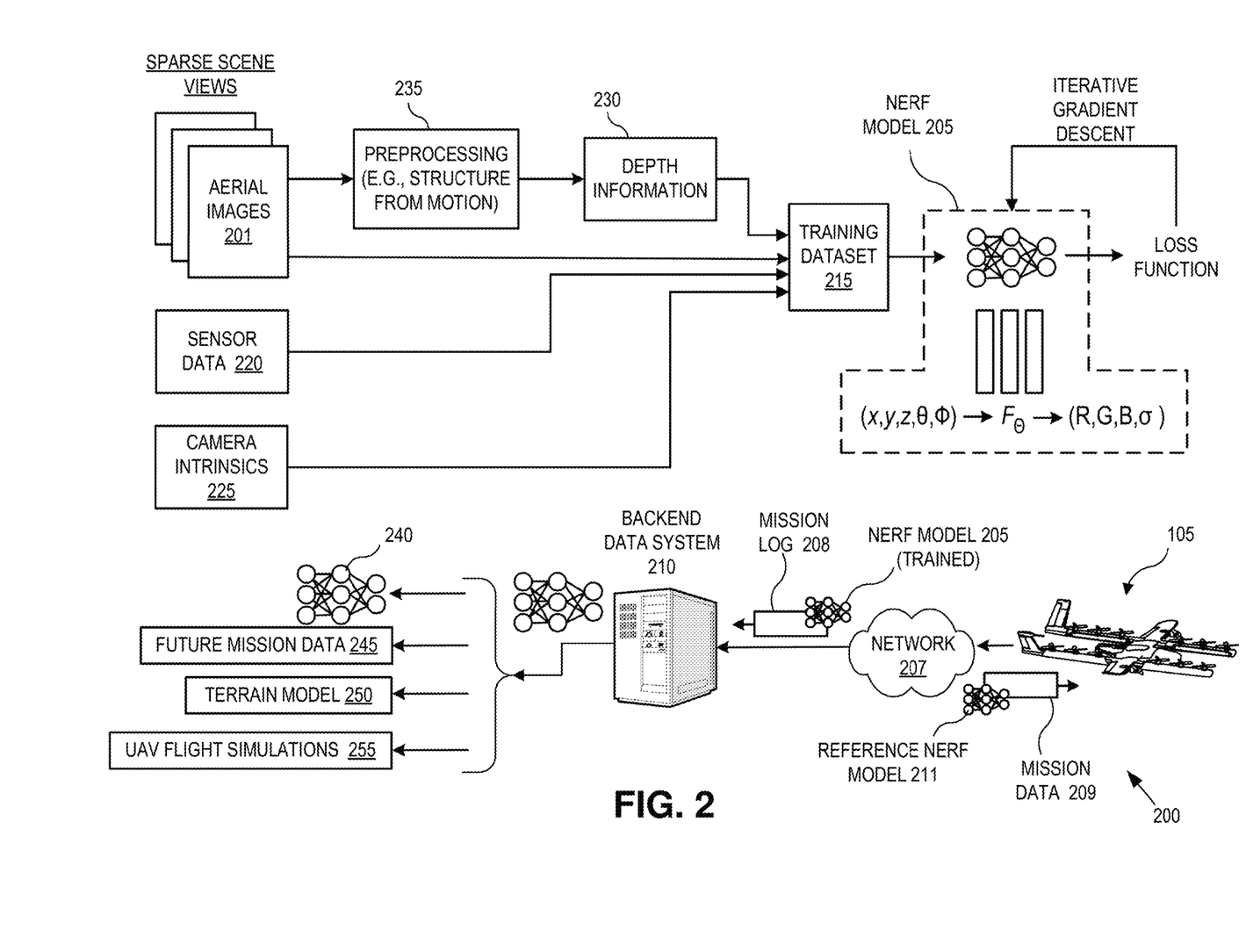
FIG. 2 is a dataflow diagram illustrating relevant components of a UAV service for compressing aerial images of a scene into a neural radiance field (NeRF) model for efficient communication to a backend data system and subsequent use thereby, in accordance with an embodiment of the disclosure.

FIG. 2 is a dataflow diagram illustrating relevant components of a UAV delivery system 200 for compressing aerial images 201 captured by UAV 105 into the weights of a NeRF model 205 for efficient communication to a backend data system 210, in accordance with an embodiment of the disclosure. UAV delivery system 200 may include one or more of the following components: terminal area 100, UAVs 105, backend data system 210, local control/communication systems residing at terminal area 100 for bridging/interfacing between UAVs 105 and backend data system 210, along with vendor/customer software interfaces for accessing the services provided by UAV delivery system 200. Collectively, these components are referred to as UAV delivery system 200 or the UAV delivery service.

As mentioned above, NeRF model 205 is able to generate novel views of a scene from novel vantage points once its weights have been optimized based upon training dataset 215. In other words, once trained, NeRF model 205 is queryable to generate these novel views. NeRF model 205 may be queryable for novel view synthesis and image-based rendering of 2D views and even synthesis of 3D models (e.g., a 3D terrain model) of the original scene. NeRF model 205 may be trained using a variety of techniques. In one embodiment, the training and view synthesis are performed using the NeRF techniques described in *NeRF: Representing Scenes as Neural Radiance Fields for View Synthesis* by Ben Mildenhall et al., arXiv:2003.08934v2 [cs.CV], 3 Aug. 2020, the contents of which are incorporated herein by reference.

Figure 3:
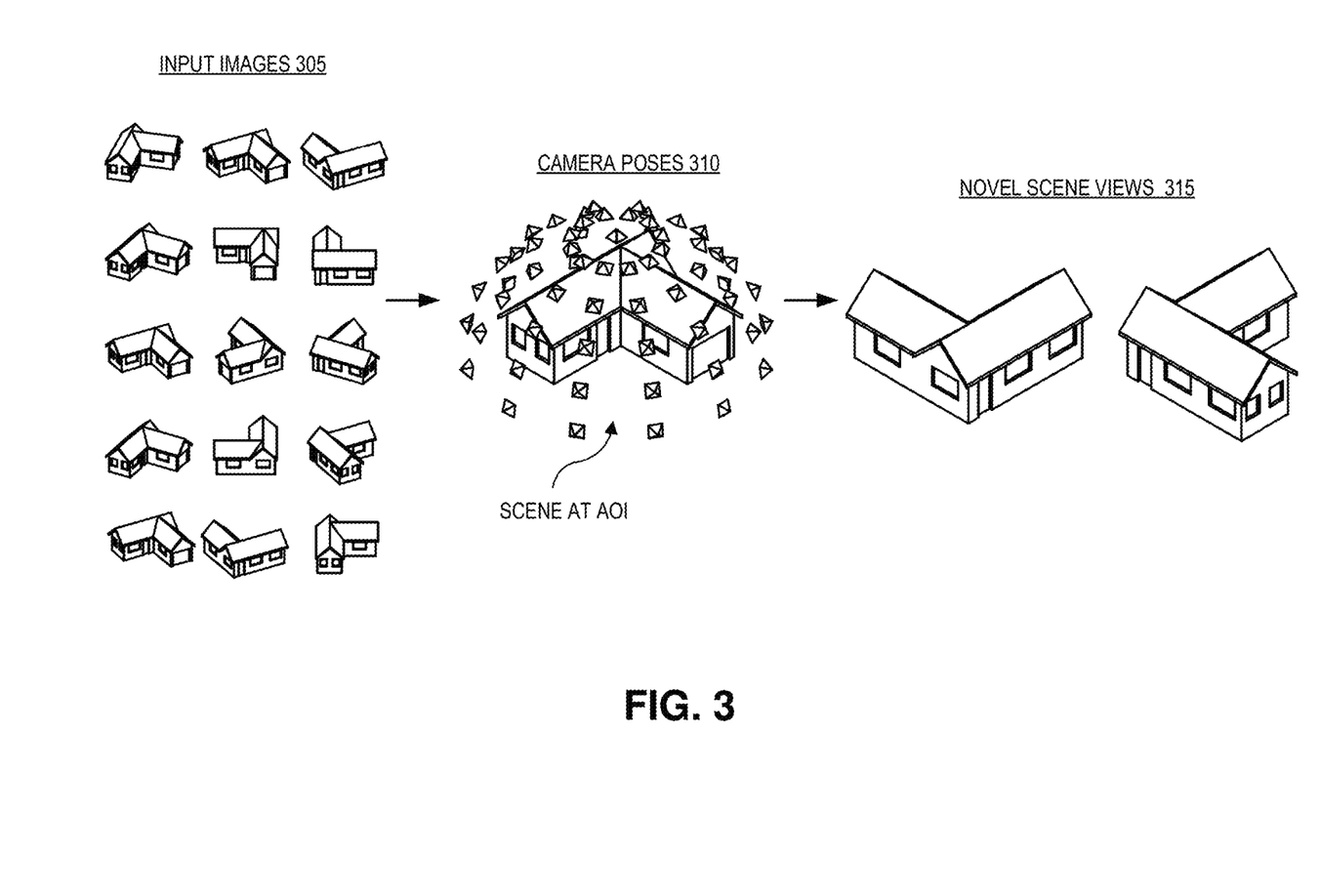
FIG. 3 illustrates the training of a NeRF model and subsequent use of the trained NeRF model to generate novel images to support operations of an UAV delivery service, in accordance with an embodiment of the disclosure.

NeRF model 205 encodes a scene for subsequent view synthesis using an underlying continuous volumetric scene function $F_\Theta$ trained on a sparse set of input views (e.g., aerial images 201 or input images 305 in FIG. 3). NeRF model 205 may be a MLP network representation of $F_\Theta$ having a fully connected deep neural network. The input to NeRF model 205 may be a five-dimension (5D) coordinate $(x,y,z,\theta,\phi)$ consisting of three positional coordinates (x,y,z) and two (or optionally three) viewing directions $(\theta,\phi)$ while the output is a volume density $\sigma$ and a directionally emitted color c, which may be represented as red (R), green (G), and blue (B) values. Thus, in one embodiment, NeRF model 205 is an MLP network $F_\Theta$ whose weights $\Theta$ map the 5D coordinates $(x,y,z,\theta,\Phi)$ to $(c, \sigma)$, which can then be integrated along viewing directions (e.g., from camera poses 310 illustrated in FIG. 3) to recreate novel views of the scene (e.g., rendered novel views 315 illustrated in FIG. 3). The 5D neural radiance field represents the scene at the AOI (e.g., destination area 115) as the volume density and directional emitted radiance at any point in space. The loss function used to train weights $\Theta$ may be constructed using a summed difference between the ground truth aerial images 201 and the corresponding scene views reconstructed by $F_\Theta$. An iterative gradient descent is performed using the training dataset 215 to minimize a loss value output from the loss function thereby compressing aerial images 201 into the weights $\Theta$ of NeRF model 205.

Training dataset 215 not only includes the sparse set of aerial images 201 (or input images 305), but may also include sensor data 220 acquired from onboard sensor(s) of UAV 105, camera intrinsics 225, and in some embodiments depth information 230 generated from preprocessing 235 of aerial images 201. Sensor data 220 may include sensor metadata indicative of a motion, a position, and/or an orientation of UAV 105 when capturing each aerial image 201. The sensor data 220 helps determine a pose estimate corresponding to each aerial image 201, as illustrated by camera poses 310 in FIG. 3. This sensor metadata may be captured using an inertial measurement unit (IMU), a global navigation satellite system (GNSS) sensor, or other onboard sensors. An example IMU includes a magnetometer, an accelerometer, and/or a gyroscope. Camera intrinsics 225 include characteristics of the onboard camera system of UAV 105 used when capturing aerial images 201. Such characteristics may include focal distance, zoom, shutter speed, exposure, etc. Depth information 230 represents image depths of pixels within aerial images 201. The image depths correspond to estimates of the separation distance between the onboard camera system and the real-world scene corresponding to each pixel in aerial images 201. Preprocessing 235 may implement a structure from motion technique to extract depth information 230 from aerial images 201. Preprocessing 235 may include optical flow analysis whereby movement of pixels between sequential video images are analyzed to estimate depth information. In an embodiment where the onboard camera system is a stereovision camera system, the preprocessing may include extracting stereo depth information due to parallax between the stereo images. Thus, preprocessing 235 may include one or more techniques that generate depth estimates between UAV 105 and the various portions of the scene to extract depth information 230.

Accordingly, in some embodiments, NeRF model 205 may be trained based upon a depth-supervised (DS) optimization of its weights, such as the DS-NeRF optimization described in *Depth-supervised NeRf: Fewer and Faster Training for Free* by Kangle Deng et al., arXiv: 2107.02791v2 [cs.CV], 29 Apr. 2022, the contents of which are hereby incorporated by reference. The DS optimization uses depth information 230 as additional ground truth data for training NeRF model 205, which in turn expedites such training based upon fewer aerial images 201. In other words, the depth information expedites convergence of the loss function during the iterative gradient descents.

As mentioned, depth information 230 extracted during preprocessing 235 from aerial images 201 may include depth information from a variety of techniques. Depth information 230 includes estimated distances between the onboard camera system and the different objects, pixels, or portions within each aerial image 201. In one embodiment, depth information 230 may be stereo depth information (e.g., due to parallax between binocular images) when aerial images 201 include stereo images acquired from a stereovision camera system. The stereo depth information may be extracted from binocular images, or received as an output from the stereovision camera system itself. In yet another embodiment, aerial images 201 may include sequential video frames acquired at a frame rate (e.g., 5, 10, 20, or 30 fps) sufficiently fast to facilitate optical flow analysis, from which depth information may be extracted. Optical flow is the pattern of motion of image pixels representing objects, surfaces, edges, etc. in a visual scene due to relative motion between the observer (e.g., the onboard camera system) and a scene (e.g., ground area below UAV 105). Optical flow is the distribution of apparent velocities, or flow velocities, of the image pixels between consecutive image frames in a video stream (e.g., sequence of image frames). Objects in the image, or image pixels, that appear to move more quickly are estimated to be closer or have a shallower image depth than image pixels that move more slowly. The divergence of these flow velocities can be used to compute a "focus of expansion," which indicates a direction of heading for UAV 105, a gradient in flow velocities across an object can be used to estimate its height, and the absolute flow velocity of an image pixel can be used to estimate its image depth in the scene (i.e., distance between object and camera). Accordingly, an onboard camera system of UAV 105 that is oriented to look down at the ground below the UAV can be leveraged to estimate distances to objects captured in aerial images 201 and store this as depth information for DS optimization of NeRF model 205. Optical flow depth estimates are calculated from flow velocities due to lateral motions while flow velocities due to rotational motions should be ignored. Accordingly, the onboard IMU sensor can be used to measure rotational motions of UAV 105 and compensate for those rotational motions when capturing a sequence of aerial images.

Figure 4A:
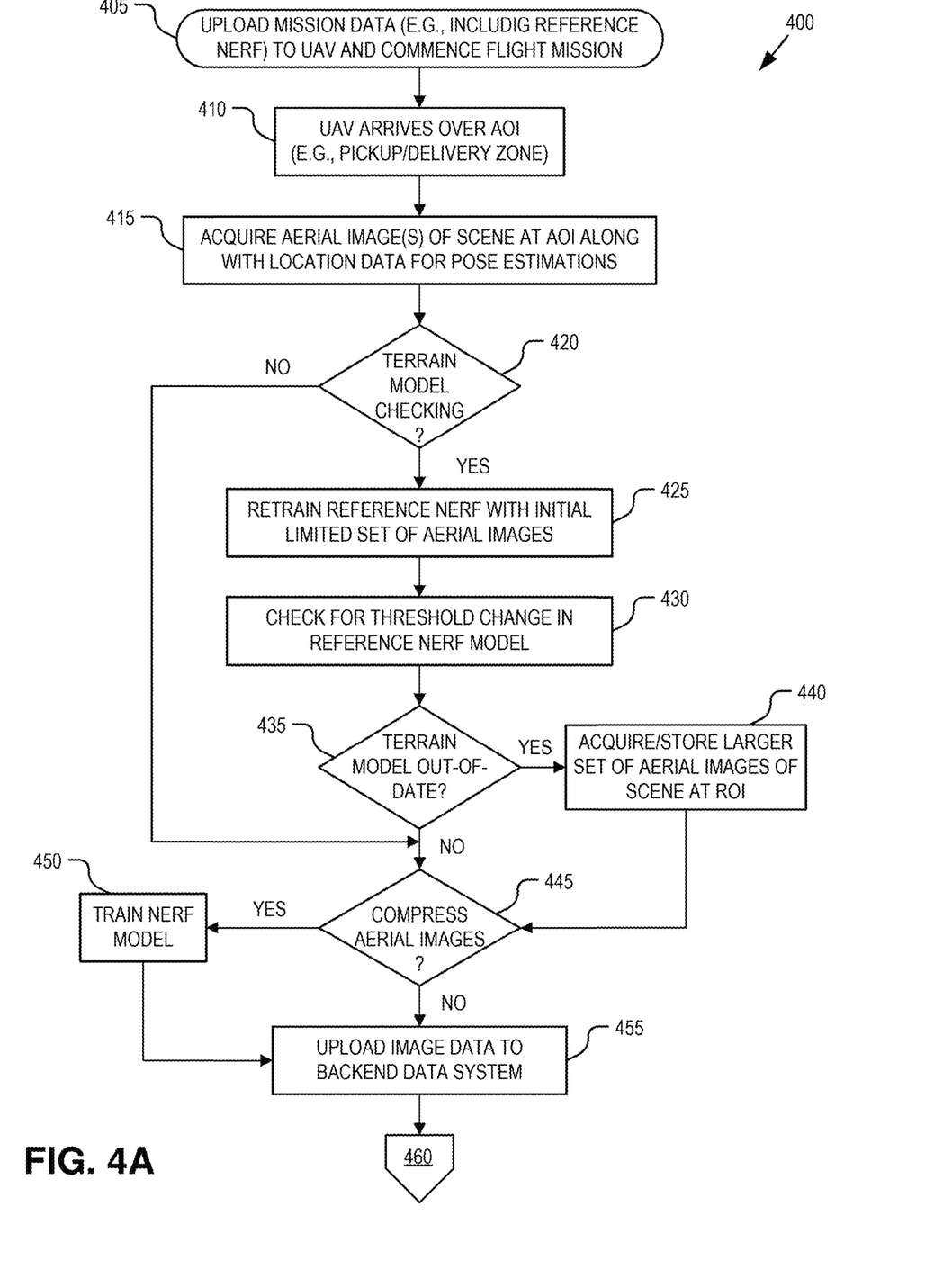
FIGS. 4A and 4B include a flow chart illustrating a method of operation of a UAV delivery service for training, communicating, and otherwise using NeRF models for triggering terrain model updates and facilitating UAV flight simulations, in accordance with an embodiment of the disclosure.
Figure 4B:
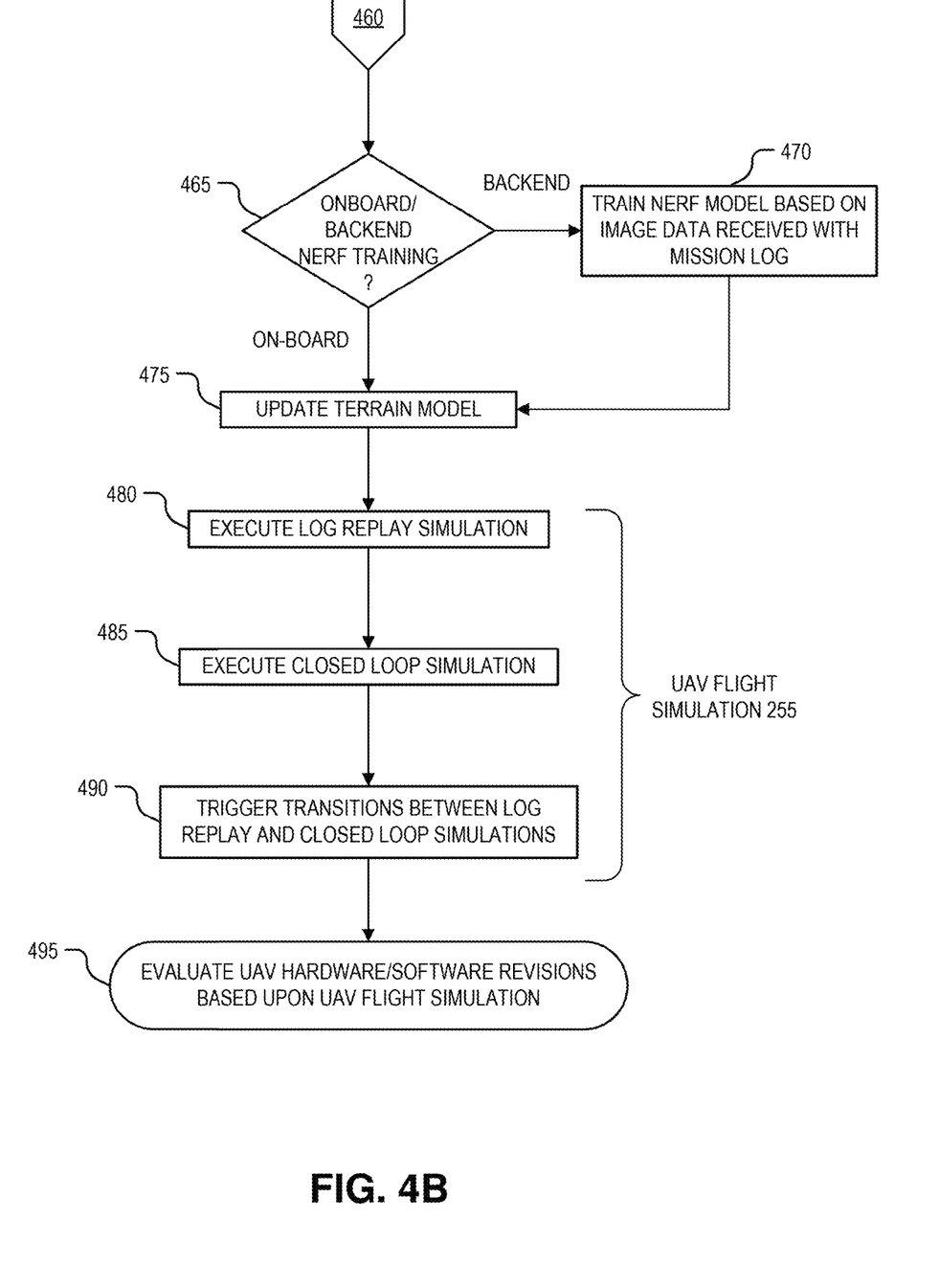

FIGS. 4A and 4B include a flow chart illustrating a process 400 for training, communicating, and otherwise using NeRF models 205 for efficient operation of a UAV delivery service, in accordance with an embodiment of the disclosure. Process 400 is described with particular reference to FIGS. 1, 2, and 5. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel.

In a process block 405, a UAV 105 is staged at terminal area 100 and prepared for a flight mission (e.g., flight mission to deliver a package). In preparation for the flight mission, mission data 209 is uploaded from backend data system 210 over network 207 to UAV 105. Mission data 209 provides data and instructions for executing the flight mission. The data may include where and what package to pickup, where/when to deliver the package, map data for navigating to/from the pickup and drop-off locations, as a well as image data to facilitate visual navigation and obstacle avoidance at one or more AOIs along the route. These AOIs may include the pickup location, the drop-off location, a waypoint along the route, or otherwise. In one embodiment, the image data is encoded into mission data 209 as one or more reference NeRF models 211. Each reference NeRF model 211 encodes a volumetric representation of the scene at a corresponding AOI and may be based upon, or correspond to, the most up-to-date version of a 3D terrain model maintained in backend data system 210 for a given AOI.

Upon arrival over an AOI by UAV 105 (process block 410), UAV 105 uses its onboard camera system to acquire aerial images 201 of the scene at the AOI (process block 415). In some embodiments, sensor data 220 from onboard sensors of UAV 105 is additionally acquired while capturing aerial images 201. The sensor data 220 may be indexed to the acquired aerial images and subsequently referenced when estimating the pose (location+perspective angle) of each aerial image 201.

In one embodiment, one or more initial aerial images 201 may be used for terrain model checking (decision block 420). Terrain model checking leverages the reference NeRF model 211 associated with the AOI to check whether the scene at the AOI has changed since last updating the terrain model maintained in backend data system 210. In other words, reference NeRF model 211 may be used to perform a quick onboard test while UAV 105 is flying over the AOI to determine whether the backend terrain model is out-of-date. In a process block 425, an initial limited set (e.g., one, two, or more) of aerial images 201 are used to retrain the reference NeRF model 211. The retrained reference NeRF model 211 is checked for a threshold change (process block 430). If the retraining results in a threshold change to reference NeRF model 211 (decision block 435), then the terrain model is deemed out-of-date. In other words, if the retraining of reference NeRF model 211 results in a non-trivial change to NeRF model 211, then the scene at the AOI is deemed to have changed in a non-trivial manner. The threshold change may be determined when one or more individual threshold changes or a collective threshold change in the weights and/or bias of the neural network of reference NeRF model 211 arise from the retraining. The larger than threshold change indicates that the gradient descents during iterative retraining cycles are no longer converged within a threshold value.

Upon determining that the terrain model is out-of-date, UAV 105 may acquire and/or store a larger set of aerial images 201 over the AOI for eventual transmission to backend data system 210 (process block 440). The larger data set may then be used to update the terrain model. In one embodiment, UAV 105 executes a special descent pattern, such as spiral descent pattern 500 illustrated in FIG. 5, to acquire a more complete, robust, and spatially distributed set of aerial images 201. In some embodiments, UAV 105 does not perform the retraining of reference NeRF model 211 until returning to terminal area 100. In this embodiment, upon return to terminal area 100, the retraining is used to determine whether or not to discard most or all of aerial images 201, or upload image data based upon aerial images 201 to backend data system 210.

In one embodiment, aerial images 201 may simply be acquired by UAV 105, buffered until return to terminal area 100, and then uploaded to backend data system 210. However, in some embodiments, aerial images 201 are compressed for efficient transmission over network 207 to backend data system 210 (decision block 445). One technique for compressing the aerial images 201 is to train NeRF model 205 on aerial images 201 (process block 450), and then upload just the trained NeRF model 205 to backend data system 210 (process block 465). NeRF model 205 may be a new NeRF model or a retrained reference NeRF model 211. Accordingly, the image data embedded in aerial images 201 may optionally be directly uploaded or compressed and then uploaded.

Of course, reference NeRF model 211 may be used for more than just determining whether the terrain model maintained in backend data system 210 is out-of-date. For example, reference NeRF model 211 may be queried when arriving in the vicinity of the AOI to provide a secondary onboard mechanism for localization of UAV 105. Aerial images 201 acquired by UAV 105 may be compared to images obtained from querying reference NeRF model 211 to derive a pose estimate associated with a given aerial image 201. The derived pose estimate may be used as a secondary geolocation mechanism for UAV 105 to increase navigational accuracy and/or operate as a fallback geolocation mechanism when GNSS sensors fail. Additionally, the derived pose estimate may also be indexed to each aerial image 201 and combined with training dataset 215 for training NeRF model 205. In other words, reference NeRF model 211 may be leveraged to bootstrap the training of new NeRF models 205 by providing more accurate pose estimates with each aerial image 201 to improve training.

Continuing to FIG. 4B via off page reference 460, training of NeRF model 205 based upon training dataset 215 including aerial images 201 may either be deferred to backend data system 210 after UAV mission log 208 is uploaded (process block 470) or performed onboard UAV 105 prior to uploading mission log 208 (decision block 465). Regardless, the trained NeRF model 205 may be used by backend data system 210 for a variety of reasons. For example, the newly trained NeRF model 205 may be used to generate input data for training other neural networks 240 used by the UAV delivery service, included within future mission data 245, used to update the 3D terrain model 250 maintained in backend data system 210 (process block 475), and even used to conduct one or more UAV flight simulations 255.

In particular, UAV flight simulations 255 executed at backend data system 210 may use one or more novel views output from the trained NeRF model 205 to test UAV hardware or software revisions under consideration before pushing those revisions out to the fleet. The quality of a simulation and the validity of its results are directly related to the quality of the data and stimulus used to execute the simulations. Accordingly, NeRF model 205 is an efficient mechanism to obtain a large quantity of photorealistic aerial images for running UAV flight simulations. The novel views output from NeRF model 205 can provide the necessary sensor stimulus (e.g., camera system stimulus) to conduct high quality simulations.

However, relying exclusively on aerial images output from a NeRF model can be compute intensive. Accordingly, UAV flight simulation 255 may be comprised of both one or more log replay simulations (process block 480) and one or more closed loop simulations (process block 485). The log replay simulation uses mission logs (e.g., mission log 208) from flight missions flown by UAVs 105 to provide sensor stimulus to a virtual UAV within UAV flight simulation 255. In contrast, the closed loop simulation uses NeRF models (e.g., NeRF model 205) to generate sensor stimulus that is provided to the virtual UAV within UAV flight simulation 255. The sensor stimulus may be aerial images along the flight path upon which the virtual UAV makes navigational decision, including obstacle avoidance decisions. The aerial images provided during the log replay simulation are limited to the aerial images actually acquired by UAV 105 during a previous flight mission. Given the storage and bandwidth constraints, the aerial images obtained from a mission log, such as mission log 208, may be incomplete and thus have limited value during the UAV flight simulation 255. In contrast, a well-trained NeRF model 205 can generate novel views from limitless pose locations for stimulating the virtual UAV during UAV flight simulation 255.

Accordingly, UAV flight simulation 255 may transition back-and-forth (process block 490) between the log replay simulation segments and closed loop simulation segments one or more times over the course of a single UAV flight simulation that simulates a flight mission (e.g., delivery mission). The transitions may be triggered for a variety of reasons. In general, log replay simulation may be used during low risk, low obstacle interaction flight segments/phases where an incomplete or sparse dataset of aerial images is adequate for the purposes of the simulation. The more robust, but compute intensive, closed loop simulation may be used during high risk, high obstacle interaction flight segments where the simulation will benefit from a dense, high fidelity dataset to stimulate the virtual UAV. For example, a transition between the log replay simulation and the closed loop simulation may be triggered based upon a geofence trigger. The geofence trigger may explicitly define where on a map closed loop vs log replay simulations are conducted. In another example, a transition between the log replay simulation and the closed loop simulation may be triggered based upon transitions between flight phases/segments of a flight mission. Thus, when the virtual UAV enters into a pickup or drop-off flight segment, the UAV flight simulation may automatically transition into a closed loop simulation during those flight phases/segments. In yet another example, a transition between the log replay simulation and the closed loop simulation may be triggered based upon an obstacle encounter by the virtual UAV during the UAV flight simulation. When the virtual UAV is determined to have a close encounter with a ground-based obstacle (e.g., passes within a threshold distance of an obstacle), the transition may be automatically triggered. In yet another example, a transition between the log replay simulation and the closed loop simulation may be triggered based upon comparing the log replay simulation against an actual mission log. If the heading, attitude, velocity, position, or route of the virtual UAV (or combination thereof) deviates by more than a threshold amount from the comparable values recorded in (or derived from) the actual mission log (e.g., mission log 208), then the transition into the closed loop simulation may be triggered. Of course, one or more of the above conditional triggers may be used in combination.

Figure 6A:
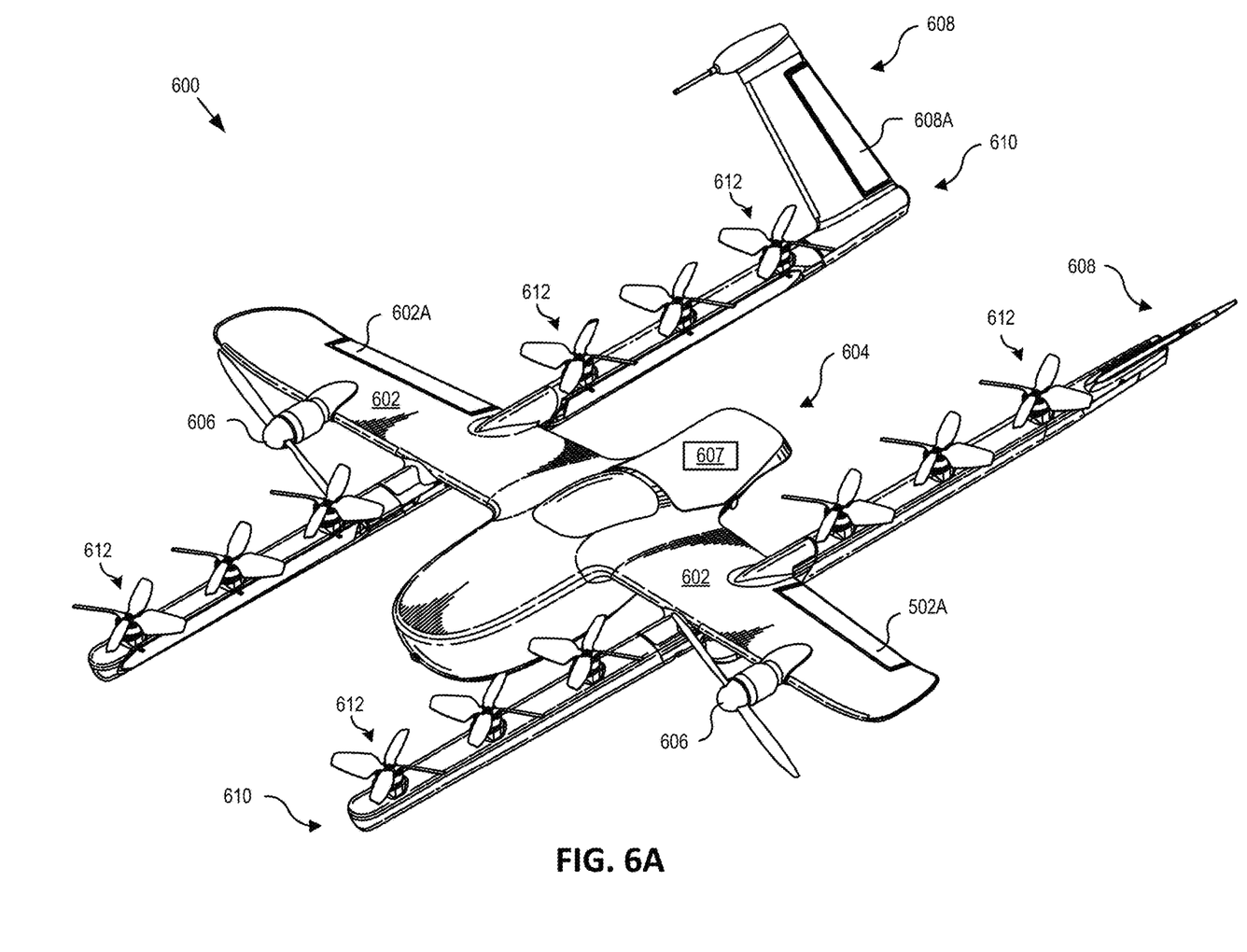
FIG. 6A is a perspective view illustration of a UAV configured for use in a UAV delivery system, in accordance with an embodiment of the disclosure.
Figure 6B:
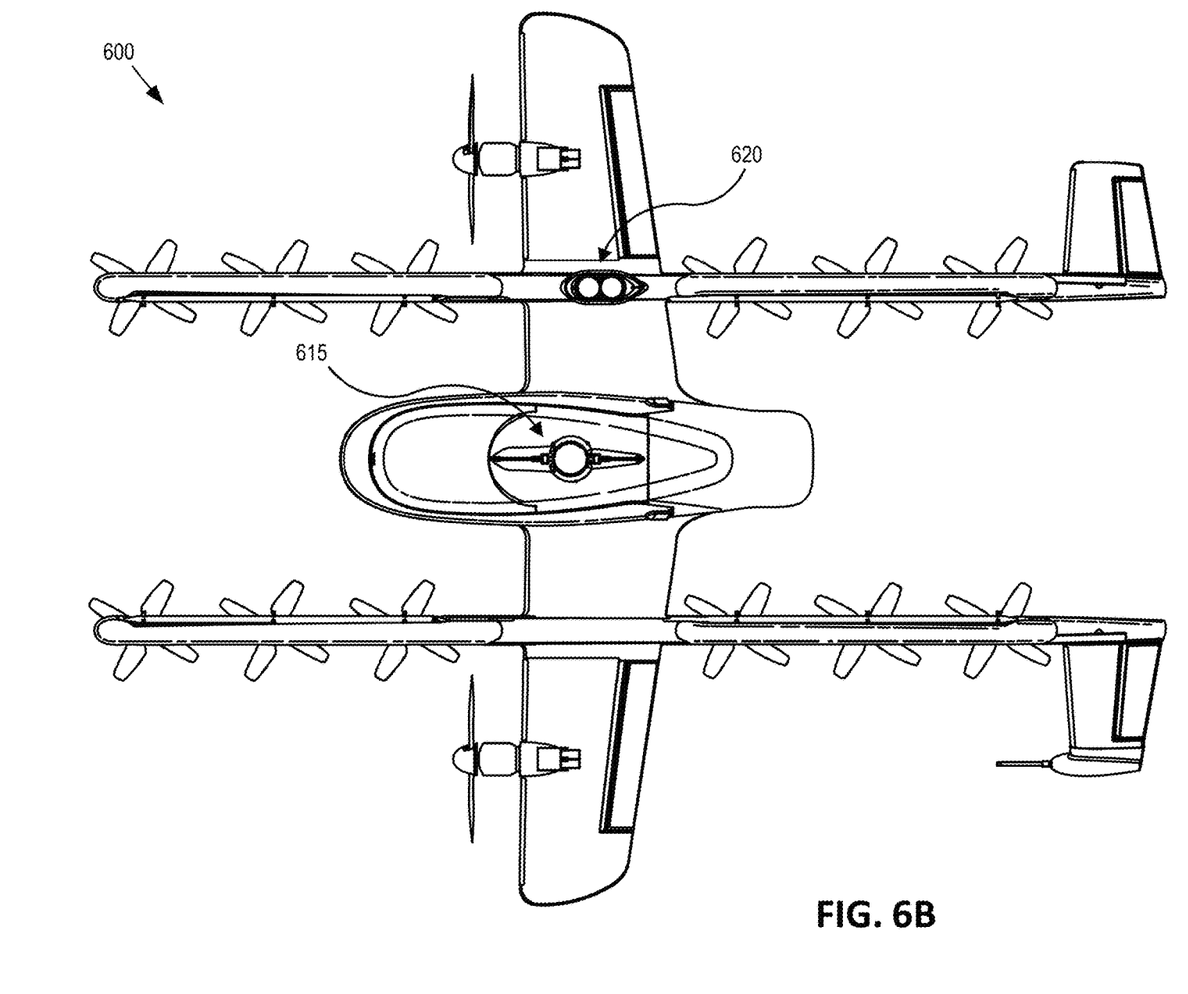
FIG. 6B is an underside plan view illustration of the UAV configured for use in the UAV delivery system, in accordance with an embodiment of the disclosure.

FIGS. 6A and 6B illustrate an example UAV 600 that is well suited for delivery of packages, in accordance with an embodiment of the disclosure. FIG. 6A is a topside perspective view illustration of UAV 600 while FIG. 6B is a bottom side plan view illustration of the same. UAV 600 is one possible implementation of UAVs 105 illustrated in FIG. 1, although other types of UAVs may be implemented as well.

The illustrated embodiment of UAV 600 is a vertical takeoff and landing (VTOL) UAV that includes separate propulsion units 606 and 612 for providing horizontal and vertical propulsion, respectively. UAV 600 is a fixed-wing aerial vehicle, which as the name implies, has a wing assembly 602 that can generate lift based on the wing shape and the vehicle's forward airspeed when propelled horizontally by propulsion units 606. The illustrated embodiment of UAV 600 has an airframe that includes a fuselage 604 and wing assembly 602. In one embodiment, fuselage 604 is modular and includes a battery module, an avionics module, and a mission payload module. These modules are secured together to form the fuselage or main body.

The battery module (e.g., fore portion of fuselage 604) includes a cavity for housing one or more batteries for powering UAV 600. The avionics module (e.g., aft portion of fuselage 604) houses flight control circuitry of UAV 600, which may include a processor and memory, communication electronics and antennas (e.g., cellular transceiver, wifi transceiver, etc.), and various sensors (e.g., global navigation satellite system (GNSS) sensors, an inertial measurement unit (IMU), a magnetic compass, a radio frequency identifier reader, etc.). Collectively, these functional electronic subsystems for controlling UAV 600, communicating, and sensing the environment may be referred to as an onboard control system 607. The mission payload module (e.g., middle portion of fuselage 604) houses equipment associated with a mission of UAV 600. For example, the mission payload module may include a payload actuator 615 (see FIG. 6B) for dispensing and recoiling a line when picking up a package during a package delivery mission. In some embodiments, the mission payload module may include camera/sensor equipment (e.g., camera, lenses, radar, lidar, pollution monitoring sensors, weather monitoring sensors, scanners, etc.). In FIG. 6B, an onboard camera system 620 is mounted to the underside of UAV 600 to support a machine vision system (e.g., monovision frame camera, stereoscopic machine vision, event camera, lidar depth camera, etc.) for visual triangulation, localization, and navigation as well as operate as an optical code scanner for reading visual codes affixed to packages. These visual codes may be associated with or otherwise match to delivery missions and provide the UAV with a handle for accessing destination, delivery, and package validation information. Onboard camera 620 may be used to acquire aerial images 201.

As illustrated, UAV 600 includes horizontal propulsion units 606 positioned on wing assembly 602 for propelling UAV 600 horizontally. UAV 600 further includes two boom assemblies 610 that secure to wing assembly 602. Vertical propulsion units 612 are mounted to boom assemblies 610. Vertical propulsion units 612 providing vertical propulsion. Vertical propulsion units 612 may be used during a hover mode where UAV 600 is descending (e.g., to a delivery location), ascending (e.g., at initial launch or following a delivery), or maintaining a constant altitude. Stabilizers 608 (or tails) may be included with UAV 600 to control pitch and stabilize the aerial vehicle's yaw (left or right turns) during cruise. In some embodiments, during cruise mode vertical propulsion units 612 are disabled or powered low and during hover mode horizontal propulsion units 606 are disabled or powered low.

During flight, UAV 600 may control the direction and/or speed of its movement by controlling its pitch, roll, yaw, and/or altitude. Thrust from horizontal propulsion units 606 is used to control air speed. For example, the stabilizers 608 may include one or more rudders 608A for controlling the aerial vehicle's yaw, and wing assembly 602 may include elevators for controlling the aerial vehicle's pitch and/or ailerons 602A for controlling the aerial vehicle's roll. While the techniques described herein are particularly well-suited for VTOLs providing an aerial delivery service, it should be appreciated that embodiments are not thus limited.

Many variations on the illustrated fixed-wing aerial vehicle are possible. For instance, aerial vehicles with more wings (e.g., an "x-wing" configuration with four wings), are also possible. Although FIGS. 6A and 6B illustrate one wing assembly 602, two boom assemblies 610, two horizontal propulsion units 606, and six vertical propulsion units 612 per boom assembly 610, it should be appreciated that other variants of UAV 600 may be implemented with more or less of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of operation of an unmanned aerial vehicle (UAV) service, the method comprising:
acquiring aerial images of a scene at an area of interest (AOI), wherein the aerial images are acquired with a UAV of the UAV service during a flight mission of the UAV that passes over the AOI;
training a neural radiance field (NeRF) model on-board the UAV with one or more of the aerial images, wherein the NeRF model comprises a neural network, which after the training, encodes a volumetric representation of the scene capable of generating novel views of the scene different than any of the aerial images used to train the NeRF model;
determining whether a terrain model of the AOI maintained in a backend data system of the UAV service is deemed out-of-date based upon whether the training of the NeRF model results in greater than a threshold change in the NeRF model; and
uploading a mission log of the flight mission to the backend data system, the mission log including image data that includes, or is derived from, at least a portion of the aerial images.

2. The method of claim 1, wherein the image data included with the mission log comprises the NeRF model after the training.

3. The method of claim 1, further comprising:
conducting a UAV flight simulation using one or more of the novel views output from the NeRF model to test at least one of a UAV hardware or software revision under consideration for updating UAVs of the UAV service.

4. The method of claim 3, wherein conducting the UAV flight simulation comprises:
executing a log replay simulation that uses the mission log from the flight mission to provide first sensor stimulus to a virtual UAV within the UAV flight simulation for a first portion of the UAV flight simulation; and
executing a closed loop simulation that uses the NeRF model to generate second sensor stimulus provided to the virtual UAV within the UAV flight simulation for a second portion of the UAV flight simulation.

5. The method of claim 4, wherein conducting the UAV flight simulation further comprises:
transitioning between the log replay simulation and the closed loop simulation based upon a geofence trigger.

6. The method of claim 4, wherein conducting the UAV flight simulation further comprises:
transitioning between the log replay simulation and the closed loop simulation based upon a transition between flight phases of the flight mission.

7. The method of claim 4, wherein conducting the UAV flight simulation further comprises:
transitioning between the log replay simulation and the closed loop simulation based upon an obstacle encounter by the virtual UAV during the UAV flight simulation.

8. The method of claim 4, wherein conducting the UAV flight simulation further comprises:
comparing the log replay simulation against the mission log; and
transitioning between the log replay simulation and the closed loop simulation based upon reaching a threshold deviation between at least one of a heading, an attitude, a velocity, a position, or a route of the virtual UAV compared to at least one corresponding value derived from the mission log.

9. The method of claim 1, wherein the training comprises retraining of the NeRF model that was previously trained based upon previously acquired aerial images of the scene at the AOI, the method further comprising:
determining whether the terrain model of the AOI maintained in the backend data system is deemed out-of-date based upon whether the retraining of the NeRF model results in greater than the threshold change in the NeRF model.

10. The method of claim 1, wherein the training comprises retraining of the NeRF model on the UAV and wherein the uploading of the mission log further comprises:
uploading a larger set of the image data to the backend data system from the UAV with the mission log when the retraining of the NeRF model results in greater than a threshold change in the NeRF model than when the retraining results in less than the threshold change in the NeRF model.

11. The method of claim 10, wherein the retraining of the NeRF model is conducted on the UAV while flying over the AOI with an initial limited set of the aerial images and used to determine whether the larger set of the aerial images is acquired or saved.

12. The method of claim 10, wherein the threshold change in the NeRF model comprises one or more individual threshold changes or a collective threshold change in weights or biases of the neural network of the NeRF model.

13. The method of claim 1, further comprising:
uploading a reference NeRF model into the UAV with mission data used by the UAV to execute the flight mission;
querying the reference NeRF model to derive a pose estimate associated with one of the aerial images; and
geolocating the UAV while the UAV is flying based upon the pose estimation.

14. At least one non-transitory computer-readable medium storing instructions that, when executed by one or more machines of an unmanned aerial vehicle (UAV) delivery service, will cause the one or more machines to perform operations comprising:
acquiring aerial images of a scene at an area of interest (AOI), wherein the aerial images are acquired with a UAV of the UAV delivery service during a flight mission of the UAV that passes over the AOI;
uploading a mission log of the flight mission to a backend data system of the UAV delivery service, the mission log including image data that includes, or is derived from, at least a portion of the aerial images; and
training a neural radiance field (NeRF) model with one or more of the aerial images, wherein the NeRF model comprises a neural network, which after the training, encodes a volumetric representation of the scene capable of generating novel views of the scene different than any of the aerial images used to train the NeRF model,
wherein the training comprises retraining of the NeRF model on the UAV and wherein the uploading of the mission log further comprises:
uploading a larger set of the image data to the backend data system from the UAV with the mission log when the retraining of the NeRF model results in greater than a threshold change in the NeRF model than when the retraining results in less than the threshold change in the NeRF model.

15. The at least one non-transitory computer-readable medium of claim 14, wherein training the NeRF model comprises training the NeRF model on-board the UAV and the image data included with the mission log comprises the NeRF model after the training.

16. The at least one non-transitory computer-readable medium of claim 14, wherein the operations further comprise:
conducting a UAV flight simulation using one or more of the novel views output from the NeRF model to test at least one of a UAV hardware or software revision under consideration for updating UAVs of the UAV delivery service.

17. The at least one non-transitory computer-readable medium of claim 16, wherein conducting the UAV flight simulation comprises:
executing a log replay simulation that uses the mission log from the flight mission to provide first sensor stimulus to a virtual UAV within the UAV flight simulation for a first portion of the UAV flight simulation; and
executing a closed loop simulation that uses the NeRF model to generate second sensor stimulus provided to the virtual UAV within the UAV flight simulation for a second portion of the UAV flight simulation.

18. The at least one non-transitory computer-readable medium of claim 17, wherein conducting the UAV flight simulation further comprises:
transitioning between the log replay simulation and the closed loop simulation based upon a geofence trigger;

transitioning between the log replay simulation and the closed loop simulation based upon transitions between flight phases of the flight mission;
transitioning between the log replay simulation and the closed loop simulation based upon an obstacle encounter by the virtual UAV during the UAV flight simulation; or
transitioning between the log replay simulation and the closed loop simulation based upon reaching a threshold deviation between at least one of a heading, an attitude, a velocity, a position, or a route of the virtual UAV compared to at least one corresponding value derived from the mission log.

19. The at least one non-transitory computer-readable medium of claim 14, wherein the training comprises retraining of the NeRF model that was previously trained based upon previously acquired aerial images of the scene at the AOI, the operations further comprising:
determining whether a terrain model of the AOI maintained in the backend data system is deemed out-of-date based upon whether the retraining of the NeRF model results in greater than a threshold change in the NeRF model.

20. The at least one non-transitory computer-readable medium of claim 14, the operations further comprising:
uploading a reference NeRF model into the UAV with mission data used by the UAV to execute the flight mission;
querying the reference NeRF model to derive a pose estimate associated with one of the aerial images; and
geolocating the UAV while the UAV is flying based upon the pose estimation.

21. At least one non-transitory computer-readable medium storing instructions that, when executed by one or more machines of an unmanned aerial vehicle (UAV) delivery service, will cause the one or more machines to perform operations comprising:
acquiring aerial images of a scene at an area of interest (AOI), wherein the aerial images are acquired with a UAV of the UAV delivery service during a flight mission of the UAV that passes over the AOI;
communicating a mission log of the flight mission to a backend data system of the UAV delivery service, the mission log including image data that includes, or is derived from, at least a portion of the aerial images;
training a neural radiance field (NeRF) model with one or more of the aerial images, wherein the NeRF model comprises a neural network, which after the training, encodes a volumetric representation of the scene capable of generating novel views of the scene different than any of the aerial images used to train the NeRF model, wherein the training comprises retraining of the NeRF model that was previously trained based upon previously acquired aerial images of the scene at the AOI; and
determining whether a terrain model of the AOI maintained in the backend data system is deemed out-of-date based upon whether the retraining of the NeRF model results in greater than a threshold change in the NeRF model.

22. A method comprising:
receiving a mission log of a flight mission of an unmanned aerial vehicle (UAV) at a backend data system of a UAV service, the mission log including image data that includes, or is derived from, aerial images acquired of a scene at an area of interest (AOI) over which the UAV passed during the flight mission;
training a neural radiance field (NeRF) model with one or more of the aerial images, wherein the NeRF model comprises a neural network, which after the training, encodes a volumetric representation of the scene capable of generating novel views of the scene different than any of the aerial images used to train the NeRF model; and
conducting a UAV flight simulation using one or more of the novel views output from the NeRF model, wherein conducting the UAV flight simulation includes:
executing a log replay simulation that uses the mission log from the flight mission to provide first sensor stimulus to a virtual UAV within the UAV flight simulation for a first portion of the UAV flight simulation; and
executing a closed loop simulation that uses the NeRF model to generate second sensor stimulus provided to the virtual UAV within the UAV flight simulation for a second portion of the UAV flight simulation.

* * * * *